United States Patent
Ren et al.

(10) Patent No.: US 11,163,555 B2
(45) Date of Patent: *Nov. 2, 2021

(54) TREE DELTA ENCODING

(71) Applicant: Beijing Voyager Technology Co., Ltd., Beijing (CN)

(72) Inventors: Liwei Ren, San Jose, CA (US); Xiaoyong Yi, Fremont, CA (US); Jiang Zhang, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 478 days.

This patent is subject to a terminal disclaimer.

(21) Appl. No.: 16/231,112

(22) Filed: Dec. 21, 2018

(65) Prior Publication Data

US 2020/0201626 A1    Jun. 25, 2020

Related U.S. Application Data

(63) Continuation of application No. 16/230,142, filed on Dec. 21, 2018.

(51) Int. Cl.
*G06F 16/00* (2019.01)
*G06F 8/71* (2018.01)
(Continued)

(52) U.S. Cl.
CPC ............. *G06F 8/71* (2013.01); *G05D 1/0055* (2013.01); *G06F 16/122* (2019.01); *G06F 16/13* (2019.01);
(Continued)

(58) Field of Classification Search
CPC ...... G06F 8/71; G06F 16/1873; G06F 16/122; G06F 16/16; G06F 16/9017;
(Continued)

(56) References Cited

U.S. PATENT DOCUMENTS 5,574,898 A     11/1996  Leblang et al.
8,078,909 B1 *  12/2011  Satish ................. G06F 11/3089
                                                              714/15

(Continued)

FOREIGN PATENT DOCUMENTS

CN        106951228 A        7/2017

OTHER PUBLICATIONS

PCT International Search Report and the Written Opinion dated Mar. 8, 2019, issued in related International Application No. PCT/US2018/067360 (9 pages).

(Continued)

*Primary Examiner* — Noosha Arjomandi
(74) *Attorney, Agent, or Firm* — Sheppard Mullin Richter & Hampton LLP

(57) ABSTRACT

Fingerprints of file node(s) within a first data tree and file node(s) within a second data tree may be generated. The first data tree may include a first set of directory nodes and a first set of file nodes. The second data tree may include a second set of directory nodes and a second set of file nodes. A delta between the first data tree and the second data tree may be generated based on a first classification of similarity between the first set of file nodes and the second set of file nodes, a second classification of similarity between the first set of directory nodes and the second set of directory nodes, and file-node delta(s) between file node(s) of the first set of file nodes and file node(s) of the second set of file nodes. The file-node delta(s) determined based on two or more of the fingerprints.

20 Claims, 24 Drawing Sheets

(51) Int. Cl.
*G06F 21/60* (2013.01)
*G06F 16/13* (2019.01)
*G05D 1/00* (2006.01)
*G06K 9/62* (2006.01)
*G06F 16/901* (2019.01)
*G06F 16/14* (2019.01)
*G06F 16/18* (2019.01)
*G06F 16/11* (2019.01)
*G06F 16/16* (2019.01)

(52) U.S. Cl.
CPC ............ *G06F 16/152* (2019.01); *G06F 16/16* (2019.01); *G06F 16/1873* (2019.01); *G06F 16/9017* (2019.01); *G06F 16/9027* (2019.01); *G06F 21/602* (2013.01); *G06K 9/6215* (2013.01); *G06K 9/6267* (2013.01)

(58) Field of Classification Search
CPC ...... G06F 16/152; G06F 21/602; G06F 16/13; G06F 16/9027; G06F 21/604; G06F 2221/2113; G06F 21/44; G06F 16/219; G05D 1/0055; G06K 9/6267; G06K 9/6215; G06K 9/6201; G06K 9/6224
See application file for complete search history.

(56) References Cited

U.S. PATENT DOCUMENTS

| | | | |
|---|---|---|---|
| 8,498,965 B1 | 7/2013 | Ren et al. | |
| 8,862,555 B1 | 10/2014 | Xu et al. | |
| 8,880,474 B2* | 11/2014 | Mason | G06F 16/172 |
| | | | 707/649 |
| 9,098,513 B1 | 8/2015 | Ren et al. | |
| 9,317,575 B1* | 4/2016 | Meran | G06F 16/23 |
| 9,355,083 B1* | 5/2016 | Meran | G06F 40/146 |
| 10,762,060 B1* | 9/2020 | Faulkner | G06F 16/168 |
| 10,909,074 B2* | 2/2021 | Mainali | G06F 16/9027 |
| 2003/0046068 A1* | 3/2003 | Perronnin | G10L 15/07 |
| | | | 704/220 |
| 2003/0225795 A1* | 12/2003 | Abdallah | G06F 8/658 |
| 2004/0150639 A1* | 8/2004 | Park | G06T 9/40 |
| | | | 345/419 |
| 2004/0181534 A1* | 9/2004 | Mortensen | G06F 8/71 |
| 2005/0049993 A1* | 3/2005 | Nori | G06F 16/284 |
| 2005/0068954 A1* | 3/2005 | Liu | H04L 45/16 |
| | | | 370/390 |
| 2006/0047649 A1* | 3/2006 | Liang | G06F 16/951 |
| 2007/0128899 A1* | 6/2007 | Mayer | G06F 21/568 |
| | | | 439/152 |
| 2009/0006496 A1* | 1/2009 | Shoens | G06F 16/1873 |
| 2009/0144603 A1* | 6/2009 | Owsley | H03M 7/40 |
| | | | 714/786 |
| 2009/0199090 A1* | 8/2009 | Poston | G06Q 10/10 |
| | | | 715/255 |
| 2010/0325181 A1* | 12/2010 | Skillcorn | G06F 16/14 |
| | | | 707/829 |
| 2012/0317079 A1* | 12/2012 | Shoens | G06F 11/2094 |
| | | | 707/639 |
| 2015/0234885 A1 | 8/2015 | Weinstein et al. | |
| 2016/0299835 A1* | 10/2016 | Jain | G06F 11/3676 |
| 2017/0177333 A1* | 6/2017 | Busayarat | H04N 21/4821 |
| 2020/0210171 A1* | 7/2020 | Ren | G06F 16/9027 |
| 2020/0210375 A1* | 7/2020 | Ren | G06F 16/116 |

OTHER PUBLICATIONS

Jain N. et al., TAPER: Tiered Approach for Eliminating Redundancy in Replica Synchronization. FAST'05: 4th USENIX Conference on File and Storage Technologies, San Francisco, CA, USA, , Dec. 16, 2005, pp. 281-294.
PCT International Search Report and the Written Opinion dated Mar. 6, 2019, issued in related International Application No. PCT/US2018/067337 (10 Pages).
PCT International Search Report and the Written Opinion dated Mar. 6, 2019, issued in related International Application No. PCT/US2018/067238 (10 Pages).
Sourceforge, "Xdelta", https://sourceforge.net/projects/xdelta/, 2013.
Percival, "Naive differences of executable code", http://www.daemonology.net/bsdiff/, 2003.
Trendafilov, Memon, Suel, "zdelta: An Efficient Delta Compression Tool", http://cis.poly.edu/tr/tr-cis-2002-02.pdf, 2002, CIS Department Polytechnic University, Brooklyn NY.
Delco and Ionescu, "xProxy: A Transparent Cashing and Delta Transfer System for Web Objects", 2000.
Macdonald, "File System Support for Delta Compression", 2003.

* cited by examiner

*200*

| Similarity Levels | Color | Requirement |
|---|---|---|
| Weak | 1 | Same Type<br>Same Fullpath |
| Fair | 2 | Weakly Matched<br>Children Fairly Matched |
| Strong | 3 | Weakly Matched<br>For Directory, Children Strongly Matched<br>For Files, Similarity of File Values Satisfy Threshold |
| Exact | 4 | Weakly Matched<br>For Directory, Children Exactly Matched<br>For Files, Same File Values |

Edit Operations:
1) UPDT(f, δ, $P_1$, $T_1$, $P_2$, $T_2$): Update a file F with parent $P_2$ at tree $T_2$, where F = f + δ, and f is a file with parent $P_1$ at tree $T_1$.

2) ADD(N,P,T): Add a node (file or directory) N to a parent directory P at T.

3) REMOVE(N,P,T): Delete a file/directory N from a directory P at T.

4) COPY(N, $P_1$, $T_1$, $P_2$, $T_2$): Copy a node N from a parent directory $P_1$ at $T_1$ to another one $P_2$ at $T_2$ where $T_1$ and $T_2$ may be the same tree or different trees.

5) MOVE(N, $P_1$, $T_1$, $P_2$, $T_2$): Move a file/directory N from its parent $P_1$ at $T_1$ to another one $P_2$ at $T_2$ where $T_1$ and $T_2$ may be the same tree or different trees.

6) RENAME(N, P, S, T): Rename a node N under its parent directory P at T with a new name S.

Simplified Edit Operations:
1) UPDT(f, δ, $P_1$, $P_2$): Update a file F with parent $P_2$, where F = f + δ, and f is a file with parent $P_1$.

2) ADD(N,P): Add a node (file or directory) N to a parent directory P.

3) REMOVE(N,P): Delete a file/directory N from a directory P.

4) COPY(N, $P_1$, $P_2$): Copy a node N from a parent directory $P_1$ to another one $P_2$.

5) MOVE(N, $P_1$, $P_2$): Move a file/directory N from its parent $P_1$ to another one $P_2$.

6) RENAME(N, P, S): Rename a node N under its parent directory P with a new name S.

FIG. 3B

Definition 3.1:
(1) For any node N in a tree T, TYPE(N) = FILE if it is a file, otherwise TYPE(N) = DIR.
(2) FULLPATH(N) for any node = the path from the tree root to the current node
(3) VALUE(N) for a file node = the binary string of the file.

*306*

Definition 3.2:
Given two trees $T_1$ and $T_2$, assume they have the same root directory names. $N_1 \in T_1$ and $N_2 \in T_2$.
(1) $N_1$ and $N_2$ are weakly matched if TYPE($N_1$) = TYPE($N_2$) and FULLPATH($N_1$) = FULLPATH($N_2$)
(2) $N_1$ and $N_2$ are fairly matched if they are weakly matched and
   (A) For TYPE($N_1$) = TYPE($N_2$) = DIR, all their children are fairly matched.
(3) $N_1$ and $N_2$ are exactly matched if they are weakly matched and one of the following conditions holds:
   (A) For TYPE($N_1$) = TYPE($N_2$) = DIR, all children are exactly matched.
   (B) For TYPE($N_1$) = TYPE($N_2$) = FILE, VALUE($N_1$) = VALUE($N_2$).
(4) $N_1$ and $N_2$ are strongly matched if they are weakly matched and one of the following conditions holds:
   (A) TYPE($N_1$) = TYPE($N_2$) = DIR, all children are strongly matched.
   (B) TYPE($N_1$) = TYPE($N_2$) = FILE, SIM(VALUE($N_1$), VALUE($N_2$)) ≥ x% for a predefined x%.

NOTE
(1) Exactly matched > Strongly matched > Fairly matched > Weakly matched.
(2) Node Properties:
(A) $N_1.color = 0$ if there is no $N_2 \in T_2$ such that they are weakly matched.
(B) $N_2.color = 0$ if there is no $N_1 \in T_1$ such that they are weakly matched.
(C) $N_1.match = N_2$ and $N_2.match = N_1$ for being weakly matched
(D) $N_1.color = N_2.color = 1$ for being weakly matched.
(E) $N_1.color = N_2.color = 2$ for being fairly matched.
(F) $N_1.color = N_2.color = 3$ for being strongly matched.
(G) $N_1.color = N_2.color = 4$ for being exactly matched.

Definition 3.2.1: Given two trees $T_1$ and $T_2$:
(1) If ROOT($T_1$) and ROOT($T_2$) are fairly matched, $T_1$ and $T_2$ are fairly matched.
(2) If ROOT($T_1$) and ROOT($T_2$) are exactly matched, $T_1$ and $T_2$ are exactly matched.
(3) If ROOT($T_1$) and ROOT($T_2$) are strongly matched, $T_1$ and $T_2$ are strongly matched

314

Definition 3.2.2: Given two trees $T_1$ and $T_2$, $N_1 \in T_1$ and $N_2 \in T_2$, both are directories:
(1) If Subtree($N_1$) and Subtree($N_2$) are fairly matched, $N_2$ is fairly matched to $N_1$.
(2) If Subtree($N_1$) and Subtree($N_2$) are strongly matched, $N_2$ is strongly matched to $N_1$.
(3) If Subtree($N_1$) and Subtree($N_2$) are exactly matched, $N_2$ is exactly matched to $N_1$.
(4) Additional properties:
  (A) $N_2$.match2 = $N_1$ if $N_2$ is at least fairly matched to $N_1$.
  (B) $N_2$.color = 4 for being exactly matched to a node of $T_1$.
  (C) $N_2$.color = 3 for being strongly matched to a node of $T_1$.
  (D) $N_2$.color = 2 for being fairly matched to a node of $T_1$.

Definition 3.2.3: Given two trees $T_1$ and $T_2$, $N_1 \in T_1$ and $N_2 \in T_2$:

(1) If $N_1$ and $N_2$ are fairly matched and their parents are weakly matched but not fairly matched, then Subtree($N_1$) and Subtree($N_2$) are the maximum fairly matched subtrees.

(2) If $N_1$ and $N_2$ are strongly matched and their parents are weakly matched but not strongly matched, then Subtree($N_1$) and Subtree($N_2$) are the maximum strongly matched subtrees.

(3) If $N_1$ and $N_2$ are exactly matched and their parents are weakly matched but not exactly matched, then Subtree($N_1$) and Subtree($N_2$) are the maximum exactly matched subtrees.

FIG. 3F

Algorithm 6.1 Matching:
Input: $T_1$ and $T_2$.
Step 1: Let $N_1$ = ROOT($T_1$), $N_2$ = ROOT($T_2$).
Step 2: Set $N_1$.color=1, $N_2$.color=1, $N_1$.match= $N_2$ and $N_2$.match = $N_1$
Step 3: Call Traverse2Trees4Match($N_1$, $N_2$).
Step 4: Return.
Output: $T_1$ and $T_2$.

*602*

Procedure Traverse2Trees4Match:
Input: $N_1 \in T_1$ and $N_2 \in T_2$.
Step 1: For each child $NN_1$ of $N_1$
    $NN_1$.color=0.
Step 2: For each child $NN_2$ of $N_2$
    If there exists a child $NN_1$ of $N_1$ such that NAME($NN_1$) = NAME($NN_2$) :
        If TYPE($NN_1$)=TYPE($NN_2$)=FILE, let $NN_1$.match=$NN_2$, $NN_2$.match = $NN_1$, $NN_1$.color=2 and $NN_2$.color=2.
            If VALUE($NN_1$)=VALUE($NN_2$), let $NN_1$.color=4 and $NN_2$.color=4 .
        If TYPE($NN_1$)=TYPE($NN_2$)=DIR, call Traverse2Trees4Match($NN_1$, $NN_2$):
    Else $NN_2$.color=0.
Step 3: If there is a child $NN_1$ of $N_1$ or $NN_2$ of $N_2$ such that $NN_1$.color=0 or $NN_2$.color=0, Return.
Step 4: Let $N_1$.color=2 and $N_2$.color=2.
Step 5: If $NN_1$.color=4, for each child $NN_1$ of $N_1$, let $N_1$.color=4 and $N_2$.color=4.
Step 6: Return.
Output: $N_1$ and $N_2$.

Algorithm 6.2 Delta Generation:
Input: $T_1$ and $T_2$.
Step 1: Call Algorithm6.1($T_1$, $T_2$) to match nodes.
Step 2: Let $\Delta = \{\}$.
Step 3: Call Traverse2ndTree4Delta(ROOT($T_2$), $\Delta$).
Step 4: Call Traverse1stTree4Delta(ROOT($T_1$), $\Delta$).
Step 5: Return.
Output: $\Delta$.

608

Procedure Traverse2ndTree4Delta:
Input: $P_2 \in T_2$, $\Delta$.
Step 1: For each child $N_2$ of $P_2$:
    If $N_2$.color=2, let $N_1 = N_2$.match:
        If TYPE($N_2$)=FILE, add UPDT(VALUE($N_1$), $\delta$, $N_2$, $P_2$) to $\Delta$ where $\delta$ = VALUE($N_2$) − VALUE($N_1$).
        If TYPE($N_2$)=DIR, call Traverse2ndTree4Delta($N_2$, $\Delta$).
    If $N_2$.color=1 and TYPE($N_2$)=DIR, call Traverse2ndTree4Delta($N_2$, $\Delta$).
    If $N_2$.color=0, add ADD($N_2$, $P_2$) to $\Delta$.
Step 2: Return.
Output: $\Delta$.

FIG. 6B

Procedure Traverse1stTree4Delta:
Input: $P_1 \in T_1$, $\Delta$.
Step 1: For each child $N_1$ of $P_1$:
    If $N_1.color=1$ and $TYPE(N_1)=DIR$, call Traverse1stTree4Delta ($N_1$, $\Delta$).
    If $N_1.color=0$, add REMOVE($N_1$, $P_1$) to $\Delta$.
Step 2: Return.
Output: $\Delta$.

Algorithm 7.1 Matching:
Input: $T_1$ and $T_2$.
Step 1: Initiate fingerprint database FPDB.
Step 2: TreeFingerprinting(ROOT($T_1$))
Step 3: Let $N_1$ = ROOT($T_1$), $N_2$ = ROOT($T_2$).
Step 4: Set $N_1$.color=1, $N_2$.color=1, $N_1$.match= $N_2$ and $N_2$.match = $N_1$.
Step 5: Call Traverse2Trees4Match2($N_1$, $N_2$).
Step 6: Return.
Output: $T_1$ and $T_2$.

704

Procedure TreeFingerprinting:
Input: N.
Step 1: If TYPE(N)=FILE, let FP = createFP(VALUE(N)) and index them with FULLPATH(N), Return.
Step 2: For each child NN of N, call TreeFingerprinting(NN).
Output: NIL.

Procedure Traverse2Trees4Match2:
Input: $N_1 \in T_1$ and $N_2 \in T_2$.
Step 1: For each child $NN_1$ of $N_1$
    $NN_1$.color=0.
Step 2: For each child $NN_2$ of $N_2$
    If there exists a child $NN_1$ of $N_1$ such that NAME($NN_1$) = NAME($NN_2$) :
        If TYPE($NN_1$)=TYPE($NN_2$)=FILE, let $NN_1$.match=$NN_2$, $NN_2$.match = $NN_1$, $NN_1$.color=2 and $NN_2$.color=2.
        If VALUE($NN_1$)=VALUE($NN_2$), let $NN_1$.color=4 and $NN_2$.color=4 .
        If TYPE($NN_1$)=TYPE($NN_2$)=DIR, call Traverse2Trees4Match2($NN_1$, $NN_2$):
    Else $NN_2$.color=0.
Step 3: If there is a child $NN_1$ of $N_1$ or $NN_2$ of $N_2$ such that $NN_1$.color=0 or $NN_2$.color=0:
    For each $NN_2$ of $N_2$ with $NN_2$.color=0, call Traverse2Trees4MatchFP($NN_2$).
    Return.
Step 4: Let $N_1$.color=2 and $N_2$.color=2.
Step 5: If $NN_1$.color=4, for each child $NN_1$ of $N_1$, let $N_1$.color=4 and $N_2$.color=4.
Step 6: Return.
Output: $N_1$ and $N_2$.

FIG. 7B

Procedure Traverse2Trees4MatchFP:
Input: N.
Step 1:
    If TYPE(N)=DIR
        For each child NN of N, call Traverse2Trees4MatchFP(NN);
    Else
        Let FP = createFP(VALUE(N)).
        Let NN= getMatchedNode(FP).
        N.match=NN.   # NN could be NIL here.
        Let $\delta$ = VALUE(N)-VALUE(NN).
        Let VALUE(N) = $\delta$.
Step 2: Return.
Output: NIL.

Algorithm 7.2 Delta Generation:
Input: $T_1$ and $T_2$.
Step 1: Call Algorithm7.1($T_1$, $T_2$) to match nodes.
Step 2: Let $\Delta = \{\}$.
Step 3: Call Traverse2ndTree4Delta2(ROOT($T_2$), $\Delta$).
Step 4: Call Traverse1stTree4Delta(ROOT($T_1$), $\Delta$).
Step 5: Return.
Output: $\Delta$.

710

Procedure Traverse1stTree4Delta:
Input: $P_1 \in T_1$, $\Delta$.
Step 1: For each child $N_1$ of $P_1$:
   If $N_1$.color=1 and TYPE($N_1$)=DIR, call Traverse1stTree4Delta($N_1$, $\Delta$).
   If $N_1$.color=0, add REMOVE($N_1$, $P_1$) to $\Delta$.
Step 2: Return.
Output: $\Delta$.

Procedure Traverse2ndTree4Delta2:
Input: $P_2 \in T_2$, $\Delta$.
Step 1: For each child $N_2$ of $P_2$:
    If $N_2$.color=2, let $N_1 = N_2$.match:
        If TYPE($N_2$)=FILE, add UPDT(VALUE($N_1$), δ, $N_2$, $P_2$) to $\Delta$ where δ = VALUE($N_2$) − VALUE($N_1$).
        If TYPE($N_2$)=DIR, call Traverse2ndTree4Delta2($N_2$, $\Delta$).
    If $N_2$.color=1 and TYPE($N_2$)=DIR, call Traverse2ndTree4Delta2($N_2$, $\Delta$).
    If $N_2$.color=0:
        Let N = CreateTreeEmptyFile ($N_2$).
        Add ADD(N, $P_2$) to $\Delta$.
        $\Delta$=UpdateTreeLeaf(N, $\Delta$).
Step 2: Return.
Output: $\Delta$.

716

Procedure CreateTreeEmptyFile:
Input: NN.
Step: Create a tree T with all nodes of NN, but for each file node FN, let VALUE(FN)=NIL.
Output: T.

Procedure UpdateTreeLeaf:
Input: N, Δ.
Step 1: For each child NN of N:
 If TYPE(NN)=DIR, call UpdateTreeLeaf(NN, Δ), Return.
 Let $NN_2$=NN.match2.
 δ = NN.VALUE.
 Add the operation UPDT ($NN_2$, δ, NN, N) to Δ.
Step 2: Return.
Output: Δ.

FIG. 7F

TREE DELTA ENCODING

CROSS-REFERENCE TO RELATED APPLICATIONS

This application claims the benefit of U.S. patent application Ser. No. 16/230,142, filed on Dec. 21, 2018, and entitled "TREE DELTA ENCODING." The entirety of the aforementioned application is incorporated herein by reference.

TECHNICAL FIELD

The disclosure relates generally to encoding delta for data trees.

BACKGROUND

File delta encoding may be used to track changes within different versions of a file. However, software may contain a number of files and a number of directories, and file delta encoding may not simply be applied to different versions of software to determine changes between different versions of software.

SUMMARY

One aspect of the present disclosure is directed to a system for modifying software using a tree-delta encoding. The system may comprise a fingerprint generator, a software manager, and a tree-delta encoding engine. The fingerprint generator may be configured to generate fingerprints of file nodes within a data tree. The software manager may be configured to provide a first data tree of a first version of the software and a second data tree of a second version of the software to the tree-delta encoding engine. The first data tree may include a first set of directory nodes and a first set of file nodes. The second data tree may include a second set of directory nodes and a second set of file nodes. The tree-delta encoding engine may be configured to generate a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes. The one or more file-node deltas may be determined based on two or more fingerprints generated by the fingerprint generator. Similarity between the first set of file nodes and the second set of file nodes and similarity between the first set of directory nodes and the second set of directory nodes may be classified within one or more of discrete similarity levels. The discrete similarity levels may include two or more of the no match level, a weak match level, a fair match level, and an exact match level. The delta may be packaged for provision to a client-side agent. The client-side agent may be configured to modify a client-side version of the software based on the delta.

In some embodiments, the first classification of similarity between the first set of file nodes and the second set of file nodes is performed based on file names, file paths, and file values. The second classification of similarity between the first set of directory nodes and the second set of directory nodes may be performed based on directory names, directory paths, nested folders, and included files.

Another aspect of the present disclosure is directed to a system for modifying software using a tree-delta encoding. The system may comprise a fingerprint generator, a software manager, and a tree-delta encoding engine. The fingerprint generator may be configured to generate fingerprints of file nodes within a data tree. The software manager may be configured to provide a first data tree of a first version of the software and a second data tree of a second version of the software to the tree-delta encoding engine. The first data tree may include a first set of directory nodes and a first set of file nodes. The second data tree may include a second set of directory nodes and a second set of file nodes. The tree-delta encoding engine may be configured to generate a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes. The one or more file-node deltas may be determined based on two or more fingerprints generated by the fingerprint generator. The delta may be packaged for provision to a client-side agent. The client-side agent may be configured to modify a client-side version of the software based on the delta.

Another aspect of the present disclosure is directed to a method for modifying software using a tree-delta encoding. The method may comprise: generating fingerprints of one or more file nodes within a first data tree and one or more file nodes within a second data tree; providing the first data tree of a first version of the software and the second data tree of a second version of the software, the first data tree including a first set of directory nodes and a first set of file nodes, and the second data tree including a second set of directory nodes and a second set of file nodes; and generating a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes, the one or more file-node deltas determined based on two or more of the fingerprints; wherein the delta is packaged for provision to a client-side agent, the client-side agent configured to modify a client-side version of the software based on the delta.

In some embodiments, the first classification of similarity between the first set of file nodes and the second set of file nodes may be performed based on file names, file paths, and file values. The second classification of similarity between the first set of directory nodes and the second set of directory nodes may be performed based on directory names, directory paths, nested folders, and included files.

In some embodiments, similarity between the first set of file nodes and the second set of file nodes and similarity between the first set of directory nodes and the second set of directory nodes may be classified within one or more of discrete similarity levels. The discrete similarity levels may include two or more of the no match level, a weak match level, a fair match level, and an exact match level. The discrete similarity levels may further include a strong match level.

In some embodiments, the client-side agent may further perform one or more of downloading a delta package, decrypting the delta package, and/or verifying integrity of the delta package.

In some embodiments, the software may include an autonomous vehicle safety and security agent software.

In some embodiments, the delta between the first data tree and the second data tree may be generated as a sequence of edit operations to be applied to a copy of the first data tree to construct a copy of the second data tree.

In some embodiments, the delta between the first data tree and the second data tree may be generated as a sequence of edit operations to be applied to an empty tree to construct a copy of the second data tree.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 2 illustrates example similarity levels for tree delta encoding, in accordance with various embodiments of the disclosure.

FIG. 3A illustrates example edit operations for tree delta encoding, in accordance with various embodiments of the disclosure.

FIG. 3B illustrates example simplified edit operations for tree delta encoding, in accordance with various embodiments of the disclosure.

FIG. 3C illustrates example definitions for tree delta encoding, in accordance with various embodiments of the disclosure.

FIG. 3D illustrates example notes for tree delta encoding, in accordance with various embodiments of the disclosure.

FIGS. 3E and 3F illustrate example definitions for tree delta encoding, in accordance with various embodiments of the disclosure.

FIGS. 6A, 6B, 6C, 7A, 7B, 7C, 7D, 7E, and 7F illustrate example algorithms for tree delta encoding, in accordance with various embodiments of the disclosure.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein enable use of delta encoding to generate deltas for data trees. By classifying nodes of the data trees into different levels of similarity, the differences between the data trees may be determined. Matching between the nodes of the data trees may be determined based on a simple determination of commonality or similarity between the nodes based on file names and file paths, or based on a more sophisticated determination of commonality or similarity between the nodes based on the content of the nodes (e.g., based on fingerprints generated from the content of the nodes).

Figure 1:
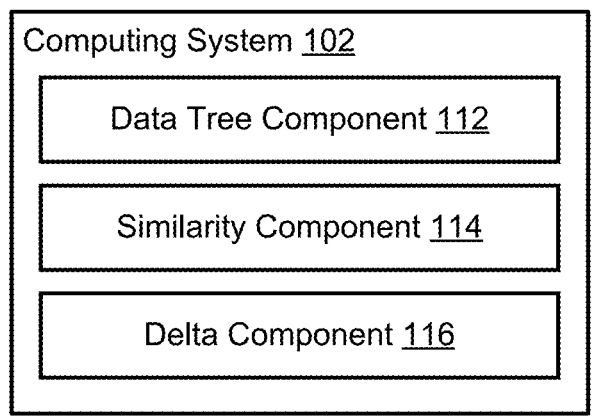
FIG. 1 illustrates an example environment for tree delta encoding, in accordance with various embodiments of the disclosure.

FIG. 1 illustrates an example environment 100 for tree delta encoding, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a data tree component 112, a similarity component 114, and a delta component 116. The computing system 102 may include other components. While the computing system 102 is shown in FIG. 1 as a single entity, this is merely for ease of reference and is not meant to be limiting. One or more components or one or more functionalities of the computing system 102 described herein may be implemented in software. One or more components or one or more functionalities of the computing system 102 described herein may be implemented in hardware. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The data tree component 112 may be configured to access one or more data trees. A data tree (or a tree) may include or be representative of a hierarchical tree structure of data. A data tree may include a root value and subtrees of children with a parent node. A data tree may include or represent file directories and files, with relationship between the directories and files represented by links among the nodes. For example, a parent directory may include a file and a subdirectory, and the nodes representing the file and the subdirectory may be linked with the node representing the parent directory. A data tree may include the files and the directory themselves. For example, a data tree accessed by the data tree component 112 may include a data tree of software. Software may contain multiple files and multiple directories. For example, rather than being included within a single file, software may include multiples files that are organized within multiple directories, which are organized in a tree structure. That is, the software may be organized in one or more directories and one or more files, and the data tree accessed by the data tree component 112 may include the director(ies) and file(s) of the software.

A data tree may include a set of directory nodes and a set of file nodes. A set of directory nodes may include one or more directory nodes, and a set of file nodes may include one or more file nodes. A file node may be included within a directory node. A directory node may be included or nested within another directory node. A directory node may include or represent a file directory, and a file node may include or represent a file.

For example, the data tree component 112 may access a first data tree and a second data tree. The first data tree including a first set of directory nodes and a first set of file nodes, and the second data tree including a second set of directory nodes and a second set of file nodes. In some embodiments, the first data tree may include a first version of a data tree and the second data tree may include a second version of the data tree. For example, the data tree component 112 may access a first version and a second version of software by accessing the corresponding data trees. Thus, the data tree component 112 may access different versions of software by accessing different data trees of the software.

Accessing a data tree may include one or more of acquiring, analyzing, determining, examining, identifying, loading, locating, obtaining, opening, receiving, retrieving, reviewing, storing, or otherwise accessing the data tree. The data tree component 112 may access a data tree from one or more locations. For example, the data tree component 112 may access a data tree from a storage location, such as an electronic storage of the computing system 102, an electronic storage of a device accessible via a network, another computing device/system (e.g., desktop, laptop, smartphone, tablet, mobile device), or other locations.

File delta encoding may refer to a process by which differences between two files are stored or transmitted. File delta encoding allows for changes to a file based on the difference (delta). For example, a first version of a file may be represented as $F_1$ and a second version of the file may be represented as $F_2$. Using file delta encoding, the difference between the files may be determined as: $\Delta=F_2-F_1$. If a computing device has a copy of $F_1$, then the copy of the $F_1$ may be changed into a copy of $F_2$ by applying delta to the copy of $F_1$. Using the delta of files may reduce the amount of information needed to be exchanged to update a file. For example, the computing device with a copy of $F_1$ may receive the Δ to update $F_1$ to $F_2$ rather than having to receive a copy of $F_2$.

However, because file delta encoding addresses differences between two files while data trees may include multiple directories and multiple files, file delta encoding cannot simply be applied to data trees to determine differences (delta) between the data tree. Rather, a framework of delta encoding for data trees must be established. The framework of data tree delta encoding (tree delta encoding) may address how to (1) define, and (2) determine (e.g., calculate) the difference (delta) or similarities between two data trees ($T_1$, $T_2$). That is, tree delta encoding may define how the following operations are to be performed: (1) delta determination: $\Delta=T_2-T_1$, and (2) tree construction/reconstruction: $T_2=T_1+\Delta$.

With respect to tree construction/reconstruction, a tree-planting scheme or a tree-trimming scheme may be used. A tree-planting scheme may include creating a new tree with a root node, and building the nodes (file nodes, directory nodes) of the new tree with one or more tree edit operations, such as COPY, ADD, RENAME, and UPDATE. A tree-trimming scheme may include modifying an existing tree with one or more tree edit operations, such as COPY, ADD, RENAME, REMOVE, MOVE, and UPDATE.

FIG. 3A illustrates example edit operations 302 for tree delta encoding, in accordance with various embodiments of the disclosure. The edit operations 302 may include an UPDATE operation UPDT( ), an ADD operation ADD( ) a REMOVE operation REMOVE( ) a COPY operation COPY( ) a MOVE operation MOVE( ) and a RENAME operation RENAME( ) The UPDATE operation may update a file F located at a directory $P_2$ in a tree $T_2$, by applying delta δ to a file f located at a directory $P_1$ in tree $T_1$. The ADD operation may add a file or a directory N to a directory P in a tree T. The REMOVE operation may delete a file or a directory N from a directory P in a tree T. The COPY operation may copy a file or a directory N from a directory $P_1$ in tree $T_1$ to a directory $P_2$ in a tree $T_2$. The MOVE operation may move a file or a directory N from a directory $P_1$ in tree $T_1$ to a directory $P_2$ in a tree $T_2$. The RENAME operation may rename a file or a directory N in a directory P of a tree T with a new name S.

FIG. 3B illustrates example simplified edit operations 304 for tree delta encoding, in accordance with various embodiments of the disclosure. The simplified edit operations 304 may parallel the edit operations 302 shown in FIG. 3A. The simplified edit operations may include an UPDATE operation UPDT( ), an ADD operation ADD( ) a REMOVE operation REMOVE( ) a COPY operation COPY( ) a MOVE operation MOVE( ) and a RENAME operation RENAME( ) with the operations occurring within a single tree.

FIG. 3C illustrates example definitions 306, 308 for tree delta encoding, in accordance with various embodiments of the disclosure. The definition 306 may define a file node as having a node type FILE and a directory node as having a node type DIR. A full path of a node N FULLPATH(N) may be defined as the path from the root of the tree to the current node. A value of a file node N VALUE(N) may be defined as the binary string of the file. Other values may be used.

The definition 308 may provide definitions of different levels of similarity between nodes of trees. Two nodes may be weakly matched if they are of the same type, Type($N_1$)=TYPE($N_2$) and the full paths of the nodes are the same, FULLPATH($N_1$)=FULLPATH($N_2$). Two directory nodes may be fairly match if they are weakly matched and all of their children (e.g., nested folders, included files) are fairly matched. Two file nodes may be fairly matched if they are weakly matched. Matching of children are not considered for file nodes because file nodes do not have children. Two file nodes may be exactly matched if they are weakly matched and values of the files are the same, VALUE($N_1$)=VALUE($N_2$). Two directory nodes may be exactly matched if they are weakly matched and all of their children are exactly matched. Two file nodes may be strongly matched if they are weakly matched and values of the files satisfy a threshold (e.g., the similarity of the file values are greater than or equal to a predefined percentage), SIM(VALUE($N_1$), VALUE($N_2$))≥x % for a predefined x %. Two directory nodes may be strongly matched if they are weakly matched and all of their children are strongly matched. In some embodiments, two directory nodes may be strongly matched if they are weakly matched and all of their children are exactly matched or strongly matched.

FIG. 3D illustrates example notes 310 for tree delta encoding, in accordance with various embodiments of the disclosure. For example, different levels of similarity may be ranked in the order of nodes that are: exactly matched>strongly matched>fairly matched>weakly matched. The node properties may be defined such that a color 0 (or some other value or classification) may be assigned to a node of a tree if there is no node in another tree such that they are weakly matched. Two nodes may be assigned as being matched for being weakly matched. A color of 1 (or some other value or classification) may be assigned to a node of a tree for being weakly matched to a node of another tree. A color of 2 (or some other value or classification) may be assigned to a node of a tree for being fairly matched to a node of another tree. A color of 3 (or some other value or classification) may be assigned to a node of a tree for being strongly matched to a node of another tree. A color of 4 (or some other value or classification) may be assigned to a node of a tree for being exactly matched to a node of another tree. Different similarity levels, corresponding color, and requirements to be classified within the different similarity levels are summarized in table 200 of FIG. 2.

FIG. 3E illustrate example definitions 312, 314 for tree delta encoding, in accordance with various embodiments of the disclosure. The definition 312 may define different levels of similarity between two trees ($T_1$, $T_2$). Two trees may be fairly matched if the roots of the trees are fairly matched. Two trees may be exactly matched if the roots of the trees are exactly matched. Two trees may be strongly matched if the roots of the trees are strongly matched.

The definition 314 may define different levels of similarity between nodes ($N_1$, $N_2$) of trees ($T_1$, $T_2$). If the portion of a tree $T_1$ (subtree) within $N_1$ is fairly matched to the portion of the tree $T_2$ (subtree) within $N_2$, $N_2$ may be fairly matched to $N_1$. If the portion of a tree $T_1$ (subtree) within $N_1$ is strongly matched to the portion of the tree $T_2$ (subtree) within $N_2$, $N_2$ may be strongly matched to $N_1$. If the portion of a tree $T_1$ (subtree) within $N_1$ is exactly matched to the portion of the tree $T_2$ (subtree) within $N_2$, $N_2$ may be exactly matched to $N_1$. Additionally, two nodes may be matched if they are at least fairly matched. The color of 4 (or some other value or classification) may be assigned to a node of tree $T_2$ if it is exactly matched to a node of tree $T_1$. The color of 3 (or some other value or classification) may be assigned to a node of tree $T_2$ if it is strongly matched to a node of tree $T_1$. The color of 2 (or some other value or classification) may be assigned to a node of tree $T_2$ if it is fairly matched to a node of tree $T_1$.

FIG. 3F illustrate an example definition 316 for tree delta encoding, in accordance with various embodiments of the disclosure. The definition 316 may define different levels of similarity between nodes ($N_1$, $N_2$) of trees ($T_1$, $T_2$). If two nodes are fairly matched and their parents are weakly matched (but not fairly matched), then the portion of a tree $T_1$ (subtree) within $N_1$ and the portion of the tree $T_2$ (subtree) within $N_2$ may be the maximum fairly matched portions (subtrees). If two nodes are strongly matched and their parents are weakly matched (but not strongly matched), then the portion of a tree $T_1$ (subtree) within $N_1$ and the portion of the tree $T_2$ (subtree) within $N_2$ may be the maximum strongly matched portions (subtrees). If two nodes are exactly matched and their parents are weakly matched (but not exactly matched), then the portion of a tree $T_1$ (subtree) within $N_1$ and the portion of the tree $T_2$ (subtree) within $N_2$ may be the maximum exactly matched portions (subtrees).

A delta between two data trees ($T_1$, $T_2$) may be determined as one or more sequences of edit operations to be performed to construct a tree such that the tree is a copy of another tree. For example, a delta may include one or more operations to be performed to a data tree $T_1$ to create a copy of a data tree $T_2$. As another example, a delta may include one or more operations to be perfumed to an empty data tree to create a copy of a data tree $T_2$.

Determination of a delta between two data trees may require (1) identification of the common or similar nodes (files, directories) between the two data tree, and (2) use of the identified common or similar nodes to generate one or more sequences of edit operations. Two common nodes may refer to the nodes being the same file or the same directory. Two similar files may include a file where the similarity between the two files are satisfy a threshold similarity value (e.g., x %). Two similar directories may include directories that include a certain number of similar files (e.g., two tree are similar if TSIM($T_1$, $T_2$)≥y % for a predefined y %).

Simple determination of commonality or similarity between file nodes may be determined based on file names and full paths of file nodes while simple determination of commonality or similarity between directory nodes may be determined based on directory names and full paths of directory nodes. More sophisticated determination of commonality or similarity between file nodes and directory nodes may be determined based on content of the file nodes and directory nodes.

The similarity component 114 may be configured to classify similarity between nodes of different data trees. The similarity component 114 may classify similarity of file nodes based on names of the file nodes, paths (full paths) of the file nodes, and values of the file nodes. The similarity component 114 may classify similarity of directory nodes based on names of the directory nodes, paths (full paths) of the directory nodes, one or more other directory nodes (e.g., nested folders) included within the directory node, and one or more files included within the directory node (e.g., in the folder, in a nest folder). For example, the similarity component 114 may classify similarity between the first set of file nodes of the first data tree and the second set of file nodes of the second data tree based on file names, file paths, and file values, and classify similarity between the first set of directory nodes of the first data tree and the second set of directory nodes of the second data tree based on directory names, directory paths, nested folders, and included files.

Classification of similarity of nodes of data trees may include classification of the nodes within one or more discrete similarity levels. Discrete similarity levels may refer to individual levels of similarity that are arranged in an order of similarity. For example, the discrete similarity levels into which the nodes are classified (e.g., associated, labeled, assigned) may include two or more of a no match level (less than weakly matched), a weak match level (weakly matched), a fair match level (fairly matched), and an exact match level (exactly matched). The discrete similarity levels may also include a strong match level (strongly matched).

No matching may include lack of matching (commonality) of names or paths. For example, a file node or a directory node of a data tree may be classified as not being matched to any file node or directory node of another data tree based on lack of there being a file node or a directory node with the same name in the same path. Weak matching may include matching of names and paths. For example, two file nodes may be weakly matched based on matching of their file names and matching of their file paths, and two directory nodes may be weakly matched based on matching of their directory names and matching of their directory paths. Fair matching of file nodes may be determined based on their weak matching, and fair matching of directory nodes may be determined based on their weak matching and fair matching of their children (files, nested folders). Exact matching of file nodes may be determined based on their weak matching and exact matching of their file values, and exact matching of directory nodes may be determined based on their weak matching and exact matching of their children. Strong matching of file nodes may be determined based on their weak matching and similarity of their file values satisfying a threshold, and strong matching of directory nodes may be determined based on their weak matching and strong (or exact) matching of their children.

In some embodiments, responsive to similarity of a node of a data tree to nodes of another data tree being classified within a no match level, the content of the node may be used to determine if there is a matching (common) node within the other data tree. For example, based on the name or the path of a given file node of a second data tree not matching a file node of a first data tree, a file node of the first data tree that matches the given file node of the second data tree may be identified based on fingerprints of the different nodes. For example, a particular file node of the first data tree may be identified as a matching file node of the given file node based on the fingerprint(s) of the particular file node matching (being the same as) the fingerprint(s) of the given file node. Once the matching file node is identified, a file node delta may be determined between the matching file node of the first data tree and the given node of the second data tree may be determined. The file node delta may be determined by using one or more file delta encoding techniques, such as bsdiff, xdelta, zdelta or other file delta encoding techniques.

One or more fingerprints may be generated for a file node. For example, a single fingerprint may be generated for a file node or multiple fingerprints may be generated for a file node. The fingerprint(s) of a file node may refer to values that identifies the corresponding file. The fingerprint(s) may uniquely identify the file. In some embodiments, the fingerprint(s) of a file may be generated based on some or all of the content of the file. The fingerprint(s) may be generated using a file-variance-resistance technique so that small or non-major changes (e.g., no change to core portion/functionality of the file) to the file results in different versions of the file having the same fingerprint or one or more common fingerprints. For example, a set of fingerprints may be generated for individual files, and two files may be determined to be a match/similar (e.g., same file, different versions of same file) if they share a certain number of fingerprints. The number of fingerprints that must be the same for two files to be matched may be fixed (e.g., fixed for the computing system 102, fixed for an application, fixed for a client) or changeable. In some embodiments, fingerprints may be generated from files based on approaches described in U.S. patent application Ser. No. 16/031,364 filed on Jul. 10, 2018, entitled "Improved File Fingerprint Generation," which is hereby incorporated herein by reference in its entirety.

In some embodiments, one or more components of the computing system 102 (shown or not shown in FIG. 1) may be configured to generate one or more fingerprints. For example, a set of fingerprints for the first set of file nodes of the first data tree and one or more fingerprints for the given file node of the second data tree may be generated. The fingerprint(s) of the given file node may be compared with fingerprints of the files nodes of the first data tree. The particular file node of the first data tree that matches the given file node of the second data tree may be identified based on their matching fingerprints.

The delta component 116 may be configured to generate a delta between two data trees based similarity (classification of similarity) of their file nodes and directory nodes. For example, the delta component 116 may generate a delta between the first data tree and the second data tree based on the classification of similarity between the first set of file nodes and the second set of file nodes and the classification of similarity between the first set of directory nodes and the second set of directory nodes. In some embodiments, the delta component 116 may be configured to generate a delta between two data trees based on similarity of their file nodes and directory nodes, and based on one or more file-node deltas. The file-node delta(s) may be determined based on the matching fingerprints of file nodes. The delta component 116 may use one or more of the algorithms discussed herein to generate a delta between two trees.

A delta between two data trees ($T_1$, $T_2$) may be determined as one or more sequences of edit operations to be performed to construct a tree such that the tree is a copy of another tree. For example, the delta component 116 may generate a delta between the first data tree and the second data tree such that application of the delta to the first data tree or an empty data tree constructs (reconstructs) the second data tree. The delta between the first data tree and the second data tree may be generated as a sequence of edit operations to be applied to a copy of the first data tree to construct a copy of the second data tree, or a sequence of edit operations to be applied to an empty tree to construct a copy of the second data tree. For instance, the delta between two data trees ($T_1$, $T_2$) may include a sequence of edit operations that may construct a new data tree (T) from one of the data trees (e.g., $T_1$) or an empty tree so that the new data tree (T) is an exact copy of the other tree ($T_2$). That is, the delta may provide a sequence of edits to construct or reconstruct the data tree ($T_2$) from the other data tree ($T_1$) or an empty data tree.

Figure 4:
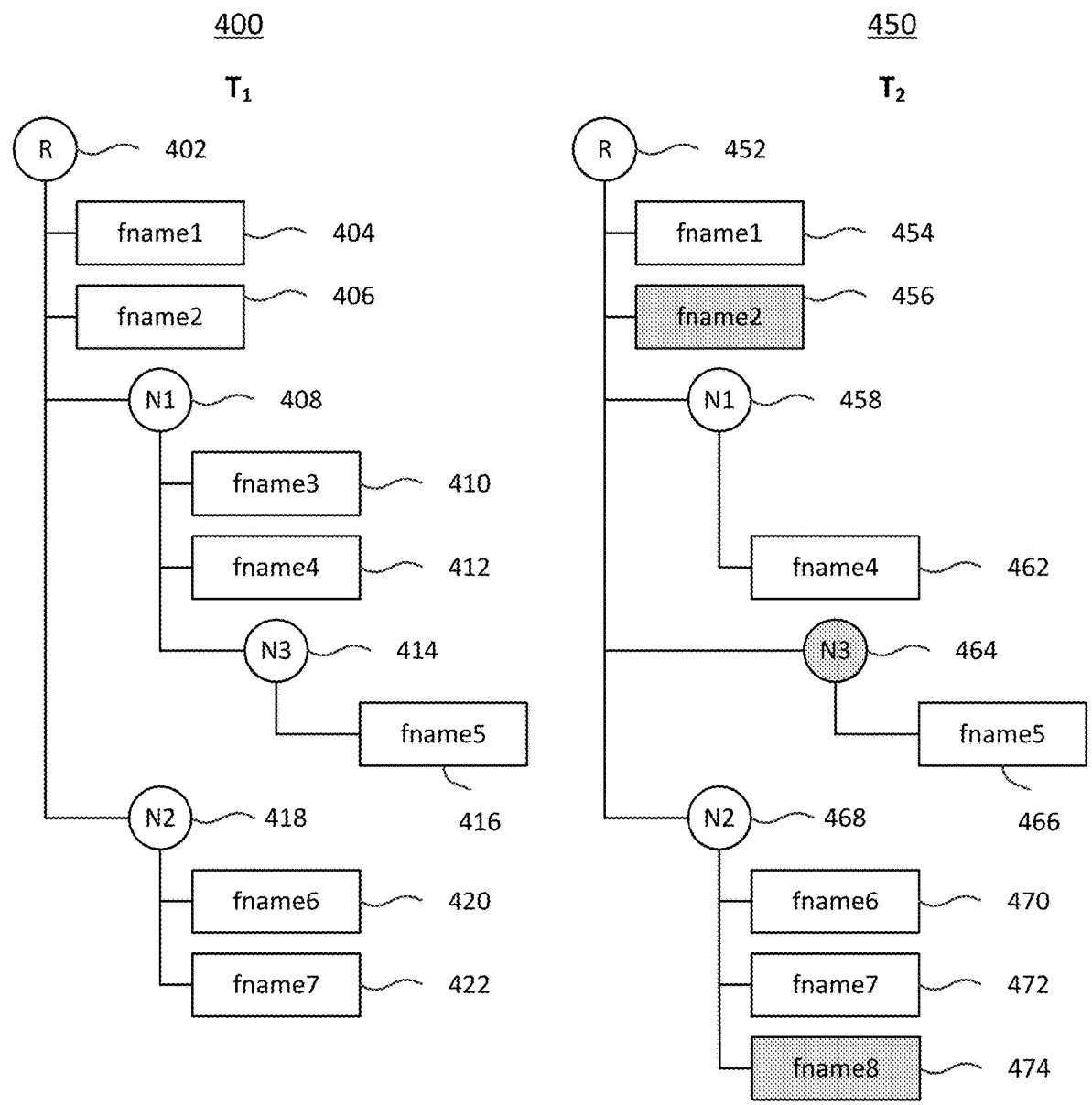
FIG. 4 illustrates example data trees, in accordance with various embodiments of the disclosures.

FIG. 4 illustrates example data trees 400, 450, in accordance with various embodiments of the disclosures. The data tree 400 may include directory nodes 402, 408, 414, 418 and file nodes 404, 406, 410, 412, 416, 420, 422. The data tree 450 may include directory nodes 452, 458, 464, 468 and file nodes 454, 456, 462, 466, 470, 472, 474. The data tree 450 may have been modified from the data tree 400. For example, the data tree 450 may have been created based on (1) modification of the file node 406 to the file node 456 (modification of the file fname2), (2) movement of the directory node 414 from being within the directory node 408 to the root node 452, and (3) addition of a new file node 474 (addition of file fname8 to N2 directory). In some embodiments, the data trees 400, 450 may represent different version of software. For example, the data tree 400 may represent an earlier version of software and the data tree 450 may represent a later version of the software.

Simple determination of commonality or similarity between the file nodes 404, 406, 410, 412, 416, 420, 422 of the data tree 400 and the file nodes 454, 456, 462, 466, 470, 472, 474 of the data tree 450 may be determined based on file names and full paths of file nodes. Simple determination of commonality or similarity between the directory nodes 402, 408, 414, 418 of the data tree 400 and the directory nodes 452, 458, 464, 468 of the data tree 450 may be determined based on directory names and full paths of directory nodes. Such matching of file nodes and directory nodes may result in the matched pairs of nodes shown in Table 1.

TABLE 1

| | |
|---|---|
| <fname1, $T_1$> | <fname1, $T_2$> |
| <fname2, $T_1$> | <fname2, $T_2$> |
| <N1, $T_1$> | <N1, $T_2$> |
| <fname4, $T_1$> | <fname4, $T_2$> |
| <N2, $T_1$> | <N2, $T_2$> |
| <fname6, $T_1$> | <fname6, $T_2$> |
| <fname7, $T_1$> | <fname7, $T_2$> |

Based on the matching file nodes and directory nodes of the data trees 400, 450, a delta (Δ) between the data trees 400, 450 may be determined as the following sequence of edit operations: Δ=UPDT(fname2, δ, R, R), REMOVE (fname3, R/N1), REMOVE(N3, R/N1), ADD(N3, R), and ADD(fname8, R/N2).

More sophisticated determination of commonality or similarity between the file nodes 404, 406, 410, 412, 416, 420, 422 of the data tree 400 and the file nodes 454, 456, 462, 466, 470, 472, 474 of the data tree 450, and the directory nodes 402, 408, 414, 418 of the data tree 400 and the directory nodes 452, 458, 464, 468 of the data tree 450 may be determined based on content of the file nodes and directory nodes. For example, for file nodes that are determined to not being weakly matched, the matching file nodes may be determined based on matching of their fingerprints. Such matching of file nodes and directory nodes may result in the matched pairs of nodes shown in Table 2.

TABLE 2

| | |
|---|---|
| <fname1, $T_1$> | <fname1, $T_2$> |
| <fname2, $T_1$> | <fname2, $T_2$> |
| <N1, $T_1$> | <N1, $T_2$> |
| <fname4, $T_1$> | <fname4, $T_2$> |
| <N2, $T_1$> | <N2, $T_2$> |
| <fname6, $T_1$> | <fname6, $T_2$> |
| <fname7, $T_1$> | <fname7, $T_2$> |
| <N3, $T_1$> | <N3, $T_2$> |
| <fname5, $T_1$> | <fname5, $T_2$> |

Based on the matching file nodes and directory nodes of the data trees 400, 450, a delta (Δ) between the data trees 400, 450 may be determined as the following sequence of edit operations: Δ=UPDT(fname2, δ, R, R), REMOVE (fname3, R/N1), MOVE(N3, R/N1, R), and ADD(fname8, R/N2). Based on the determination that the node N3 of T1 is the same as the node N3 of T2, the delta may include a movement of the node N3 from the node N1 to the R (root) directory, rather than a combination of a deletion and an addition operation.

Figure 5:
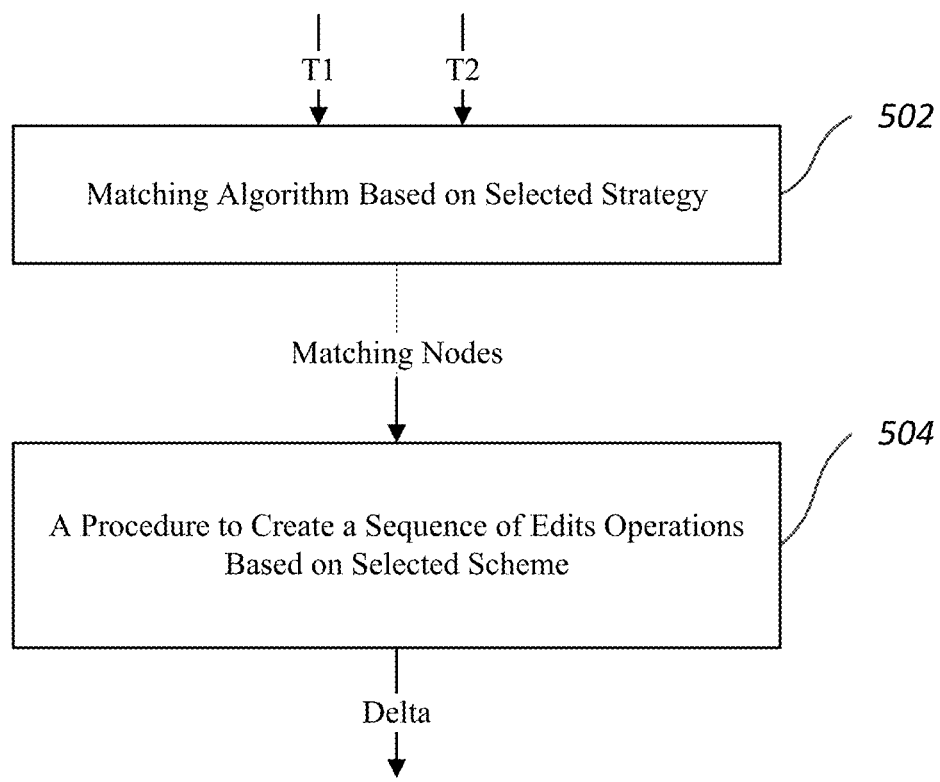
FIG. 5 illustrates an example flow for tree delta encoding, in accordance with various embodiments of the disclosure.

FIG. 5 illustrates an example flow 500 for tree delta encoding, in accordance with various embodiments of the disclosure. The flow 500 may include an input of multiple data trees ($T_1$, $T_2$) into a block 502. At block 502, a matching algorithm to determine similarity between nodes of the data trees may be used based on a selected strategy. Strategies from which matching algorithms may be selected may include (1) a simple determination of commonality or similarity between nodes, and (2) a more sophisticated determination of commonality or similarity between nodes (using content of the nodes). on the selected strategies, matching nodes may be identified.

At block 504, a procedure to create a sequence of edit operations (delta) may be used based on a selected scheme. Scheme from which procedures may be selected may include (1) a tree-trimming scheme: modifying an existing tree with one or more tree edit operations, and (2) a tree-planting scheme: creating a new tree with a root node, and building the nodes (file nodes, directory nodes) of the new tree with one or more tree edit operations. Based on the selected scheme, the delta between the data trees may be generated.

More sophisticated determination of commonality or similarity between nodes may allow for identification of data tree modifications, such as (1) movement of a file node or a directory node to a different directory node, (2) change of file node name or a directory node name, or (3) a file node or a directory node being copied to another location. Identification of other data tree modifications are contemplated. More sophisticated determination of commonality or similarity between nodes may allow for higher compression of delta between data trees. For example, the size of delta may be reduced by being able to use UPDT operation to change a file in a data tree (from an older version to a newer version of the file) rather than using a REMOVE (to remove the older version of the file) and an ADD operation (to add the new version of the file). As another example, a matched directory node in a tree may be created via COPY, MOVE, or RENAME operations, rather than an ADD operation.

FIGS. 6A, 6B, and 6C illustrate example algorithms for tree delta encoding based on simple matching of nodes, in accordance with various embodiments of the disclosure. While the algorithms shown in FIGS. 6A, 6B, and 6C are directed to constructing (reconstructing) trees based on a tree-trimming scheme, this is merely shown as being illustrative and is not meant to be limiting. Same, similar, or different algorithms may be used for constructing (reconstructing) trees based on a tree-trimming scheme or a tree-planting scheme.

FIG. 6A illustrates example algorithms 602, 604 for tree delta encoding, in accordance with various embodiments of the disclosure. Inputs to the algorithm 602 may include two data trees ($T_1$, $T_2$). At step 1, roots of the data trees ($T_1$, $T_2$) may be assigned as ($N_1$, N2). At step 2, roots ($N_1$, N2) of the data trees may be set as being weakly matched to each other. At step 3, similarity matching of the children (files nodes, directory nodes) of the roots ($N_1$, N2) may be determined by using the algorithm 604. At step 1, the algorithm 604 may set the children ($NN_1$) of the root ($N_1$) of the first tree ($T_1$) as not being matched. At step 2, for each child ($NN_2$) of the root (N2) of the second tree ($T_2$), the algorithm 604 may traverse the first tree ($T_1$) to determine whether there is a matching node. A child ($NN_2$) of the root (N2) of the second tree ($T_2$) and a child ($NN_1$) of the root ($N_1$) of the first tree ($T_1$) may be determined to be: (1) fairly matched (color=2) if they are both files and the names of the files are the same; and (2) exactly matched (color=4) if they are both files, the names of the files are the same, and the values of the files (e.g., binary string of the files) are the same. If a child ($NN_2$) of the root (N2) of the second tree (T$_2$) and a child (NN$_1$) of the root (N$_1$) of the first tree (T$_1$) have the same name and are both directories, then the algorithm 604 may be used to determine similarity matching of children of the directories. Otherwise, the child (NN$_2$) of the root (N2) of the second tree (T$_2$) may be set as not being matched. At step 3, if any child (NN$_1$) of the root (N$_1$) of the first tree (T$_1$) or any child (NN$_2$) of the root (N2) of the second tree (T$_2$) are determined to not be matched, the algorithm 604 may end. At step 4, the root (N$_1$) of the first tree (T$_1$) and the root (N2) of the second tree (T$_2$) may be set as being fairly matched (color=2). At step 5, if each child (NN$_1$) of the root (N$_1$) of the first tree (T$_1$) are determined to be exactly matched, then the root (N$_1$) of the first tree (T$_1$) and the root (N2) of the second tree (T$_2$) may be set as being exactly matched (color=4).

FIG. 6B illustrates example algorithms 606, 608 for tree delta encoding, in accordance with various embodiments of the disclosure. The algorithm 606 may generate a delta (Δ) between two data trees (T$_1$, T$_2$). At step 1, the algorithm 602 may be called to match nodes of the data trees (T$_1$, T$_2$). At step 2, the delta (Δ) may be initialized as being empty. At step 3, the algorithm 608 may be called to add one or more edit options to the delta (Δ) based on traversal of the root of the second tree (T$_2$). At step 4, the algorithm 610 may be called to add one or more edit options to the delta (Δ) based on traversal of the root of the first tree (N$_1$).

The algorithm 608 may add one or more edit options to the delta (Δ) based on traversal of the second tree (T$_2$). The algorithm 608 may add one or more UPDT( ) to the delta (Δ). The algorithm 608 may add one or more ADD( ) to the delta (Δ). For each child (N2) of a directory (P$_2$) of the second tree (T$_2$), the following may be performed: (1) if the child (N2) is a file and fairly matched to a node (N$_1$) of the first tree (T$_1$), an UPDT( ) to modify the child (N2) based on a difference between the child (N2) and the node (N$_1$) may be added to the delta (Δ); (2) if the child (N2) is a directory and fairly matched to a node (N$_1$) of the first tree (T$_1$), the algorithm 608 may be used to traverse the directory to add one or more edit options to the delta (Δ); (3) if the child (N2) is a directory and weakly matched to a node (N$_1$) of the first tree (T$_1$), the algorithm 608 may be used to traverse the directory to add one or more edit options to the delta (Δ); and (4) if the child (N2) is not matched to a node (N$_1$) of the first tree (T$_1$), an ADD( ) to add the child (N2) in the directory (P$_2$) may be added to the delta (Δ).

FIG. 6C illustrates example an algorithms 610 for tree delta encoding, in accordance with various embodiments of the disclosure. The algorithm 610 may add one or more edit options to the delta (Δ) based on traversal of the first tree (T$_1$). The algorithm 610 may add one or more REMOVE( ) to the delta (Δ). For each child (N$_1$) of a directory (P$_1$) of the first tree (T$_1$), the following may be performed: if the child (N$_1$) is a directory and weakly matched, the algorithm 610 may be used to traverse the directory to add one or more edit options to the delta (Δ); and if the child (N$_1$) is not matched, a REMOVE( ) to remove the child (N$_1$) from the directory (P$_1$) may be added to the delta (Δ).

FIGS. 7A, 7B, 7C, 7D, 7E, and 7F illustrate example algorithms for tree delta encoding based on sophisticated matching of nodes, in accordance with various embodiments of the disclosure. While the algorithms shown in FIGS. 7A, 7B, 7C, 7D, 7E, and 7F are directed to constructing (reconstructing) trees based on a tree-trimming scheme, this is merely shown as being illustrative and is not meant to be limiting. Same, similar, or different algorithms may be used for constructing (reconstructing) trees based on a tree-trimming scheme or a tree-planting scheme.

FIG. 7A illustrates example algorithms 702, 704 for tree delta encoding, in accordance with various embodiments of the disclosure. Inputs to the algorithm 702 may include two data trees (T$_1$, T$_2$). At step 1, a fingerprint database (FPDB) may be initiated. At step 2, the algorithm 704 may be used to generate fingerprints of file nodes of the tree (T$_1$). At step 3, roots of the data trees (T$_1$, T$_2$) may be assigned as (N$_1$, N2). At step 4, roots (N$_1$, N2) of the data trees may be set as being weakly matched to each other. At step 5, similarity matching of the children (files nodes, directory nodes) of the roots (N$_1$, N2) may be determined by using an algorithm 706 (shown in FIG. 7B).

The algorithm 704 may generate the fingerprint(s) of a node (N). If the node (N) is a file, the fingerprint(s) (FP) of the file may be generated based on the content of the file (value of N) and indexed (e.g., within the fingerprint database FPDB) with the full path of the node (N). If the node (N) is a directory, the algorithm 704 may be used for each child (NN) of the node (N).

FIG. 7B illustrates an example algorithms 706 for tree delta encoding, in accordance with various embodiments of the disclosure. At step 1, the algorithm 706 may set the children (NN$_1$) of a node (N$_1$) of the first tree (T$_1$) as not being matched. At step 2, for each child (NN$_2$) of the node (N2) of the second tree (T$_2$), the algorithm 706 may traverse the first tree (T$_1$) to determine whether there is a matching node. A child (NN$_2$) of the node (N2) of the second tree (T$_2$) and a child (NN$_1$) of the node (N$_1$) of the first tree (T$_1$) may be determined to be: (1) fairly matched (color=2) if they are both files and the names of the files are the same; and (2) exactly matched (color=4) if they are both files, the names of the files are the same, and the values of the files (e.g., binary values of the files) are the same. If a child (NN$_2$) of the node (N2) of the second tree (T$_2$) and a child (NN$_1$) of the node (N$_1$) of the first tree (T$_1$) have the same name and are both directories, then the algorithm 706 may be used to determine similarity matching of children of the directories. Otherwise, the child (NN$_2$) of the node (N2) of the second tree (T$_2$) may be set as not being matched. At step 3, if any child (NN$_1$) of the node (N$_1$) of the first tree (T$_1$) or any child (NN$_2$) of the node (N2) of the second tree (T$_2$) are determined to not be matched, an algorithm 708 (shown in FIG. 7C) may be used for each child (NN$_2$) of the node (N2) of the second tree (T$_2$). At step 4, the node (N$_1$) of the first tree (T$_1$) and the node (N2) of the second tree (T$_2$) may be set as being fairly matched (color=2). At step 5, if each child (NN$_1$) of the node (N$_1$) of the first tree (T$_1$) are determined to be exactly matched, then the node (N$_1$) of the first tree (T$_1$) and the node (N2) of the second tree (T$_2$) may be set as being exactly matched (color=4).

FIG. 7C illustrates an example algorithm 708 for tree delta encoding, in accordance with various embodiments of the disclosure. The algorithm 708 may find matching nodes based on their fingerprints and determine difference between the matched nodes. If a node (N) is a directory, then the algorithm 708 may be called for each child (NN) of the node (N). If the node (N) is a file, then the following may be performed: the fingerprint(s) (FP) of the file may be generated based on the content of the file (value of N); a fingerprint database (e.g., the fingerprint database FPBD) may be searched for the fingerprint(s) (FP) of the file using getMatchedNode( ) to find a matching node (NN) with one or more common fingerprints. The difference between the node (N) and the matching node (NN) may be determined as a difference between the value of the node (N) and the value of the node (NN).

FIG. 7D illustrates example algorithms 710, 712 for tree delta encoding, in accordance with various embodiments of the disclosure. The algorithm 710 may generate a delta (Δ) between two data trees ($T_1$, $T_2$). At step 1, the algorithm 702 may be called to match nodes of the data trees ($T_1$, $T_2$). At step 2, the delta (Δ) may be initialized as being empty. At step 3, the algorithm 714 may be called to add one or more edit options to the delta (Δ) based on traversal of the root of the second tree ($T_2$). At step 4, the algorithm 712 may be called to add one or more edit options to the delta (Δ) based on traversal of the root of the first tree ($N_1$).

The algorithm 712 may add one or more edit options to the delta (Δ) based on traversal of the first tree ($T_1$). The algorithm 712 may add one or more REMOVE( ) to the delta (Δ). For each child ($N_1$) of a directory ($P_1$) of the first tree ($T_1$), the following may be performed: if the child ($N_1$) is a directory and weakly matched, the algorithm 712 may be used to traverse the directory to add one or more edit options to the delta (Δ); and if the child ($N_1$) is not matched, a REMOVE( ) to remove the child ($N_1$) from the directory ($P_1$) may be added to the delta (Δ).

FIG. 7E illustrates example algorithms 714, 716 for tree delta encoding, in accordance with various embodiments of the disclosure. The algorithm 714 may add one or more edit options to the delta (Δ) based on traversal of the second tree ($T_2$). The algorithm 714 may add one or more UPDT( ) to the delta (Δ). The algorithm 714 may add one or more ADD( ) to the delta (Δ). For each child (N2) of a directory ($P_2$) of the second tree ($T_2$), the following may be performed: (1) if the child (N2) is a file and fairly matched to a node ($N_1$) of the first tree ($T_1$), an UPDT( ) to modify the child (N2) based on a difference (δ) between the child (N2) and the node ($N_1$) may be added to the delta (Δ); (2) if the child (N2) is a directory and fairly matched to a node ($N_1$) of the first tree ($T_1$), the algorithm 714 may be used to traverse the directory to add one or more edit options to the delta (Δ); (3) if the child (N2) is a directory and weakly matched to a node ($N_1$) of the first tree ($T_1$), the algorithm 714 may be used to traverse the directory to add one or more edit options to the delta (Δ); and (4) if the child (N2) is not matched, a tree file (N) may be created for the child (N2) using the algorithm 716, an ADD( ) to add the tree file (N) in the directory ($P_2$) may be added to the delta (Δ), and the algorithm 718 (shown in FIG. 7F) may be used. The algorithm 716 may create a tree (T) with all nodes of the input (NN), where the file nodes are created as shells for the files. That is, the content of the file nodes may be empty in the tree (T). If the file nodes are leaves of the tree (T), the tree (T) may have outlines of the leaves, but not the content of the leaves.

FIG. 7F illustrates an example algorithm 718 for tree delta encoding, in accordance with various embodiments of the disclosure. The algorithm 718 may update the content of file nodes of a node (N) (fill in content of the leaves of node N). For each child (NN) of the node (N), the following may be performed. If the child (NN) is a directory, the algorithm 718 may be used to update the content of the file nodes of the child (NN). If the child (NN) is a file, the content of the child (NN) may be determined based on the value of the matching node and the difference (δ) between the child (NN) and the matching node.

Figure 8:
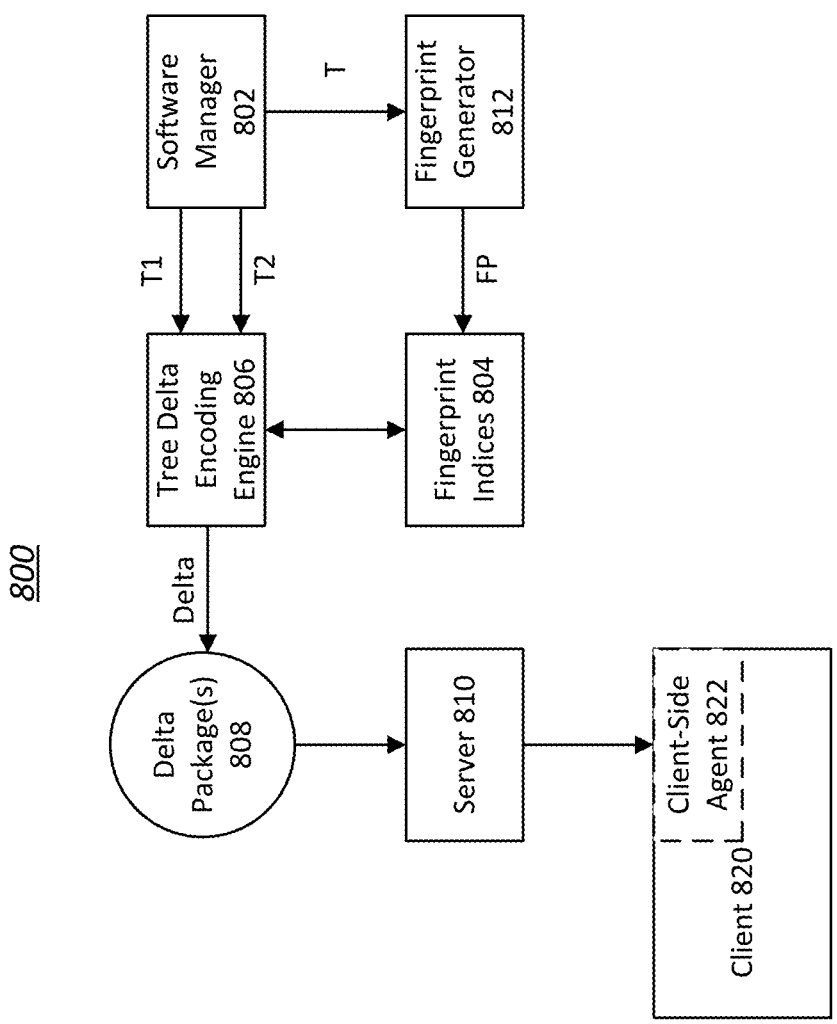
FIG. 8 illustrates an example client-server architecture, in accordance with various embodiments of the disclosure

FIG. 8 illustrates an example client-server architecture 800, in accordance with various embodiments of the disclosure. The architecture 800 may include a server 810 and a client 820. The client 820 may include a client-side agent 822. The server 810 may include or be coupled (directly or indirectly) to a software manager 802, a fingerprint generator 812, and a tree delta encoding engine 806. The fingerprint generator 812 may be configured to generate fingerprints of file nodes within a data tree. The software manager 802 may be configured to provide (1) one or more data trees (T) to the fingerprint generator 812 for generation of fingerprints of the file nodes, and (2) different data trees (T1, T2) to the tree delta encoding engine 806. Fingerprints generated by the fingerprint generator 812 may be stored within fingerprint indices 804 (e.g., one or more tables, one or more databases). Individual data trees may include a set of directory nodes and a set of file nodes. In some embodiments, the data trees provided by the software manager 802 may include different versions of a data tree. For example, a first data tree (T1) provided by the software manager 802 may be one version of the data tree and a second data tree (T2) provided by the software manager 802 may be another version of the data tree. The data tree may be or include software. For instance, the first data tree (T1) provided by the software manager 802 may be one version of the software and a second data tree (T2) provided by the software manager 802 may be another version of the software.

The tree-delta encoding engine 806 may be configured to generate a delta between different data trees based on similarity classification of nodes within the data trees. For example, the tree delta encoding engine 806 may generate a delta between the first data tree (T1) and the second data tree (T2) (Δ=T2−T1) based on a first classification of similarity between the file nodes of the two data trees and a second classification of similarity between the directory nodes of the two data trees. The delta may be generated further based on one or more file node deltas between the file nodes of the two data trees, which file nodes may be matched based on fingerprints generated by the fingerprint generator 812 and stored within fingerprint indices 804. The delta may be packaged into one or more delta packages 808 for provision by the server 810 to the client-side agent 822.

The client-side agent 822 may be configured to modify a client-side version of the data tree based on the delta. For example, the client-side agent 822 may modify the client 820 or a client-side version of software (software installed in, stored by, used by the client 820) based on the delta. The client 820 (or the client-side agent 822) may update software of the client 820 using the tree delta encoding described herein.

For example, the delta between the first data tree (T1) and the second data tree (T2) may be generated as a sequence of edit operations to be applied to a copy of the first data tree (T1) to construct a copy of the second data tree (T2). As another example, the delta between the first data tree (T1) and the second data tree (T2) may be generated as a sequence of edit operations to be applied to an empty tree to construct a copy of the second data tree (T2).

Figure 9:
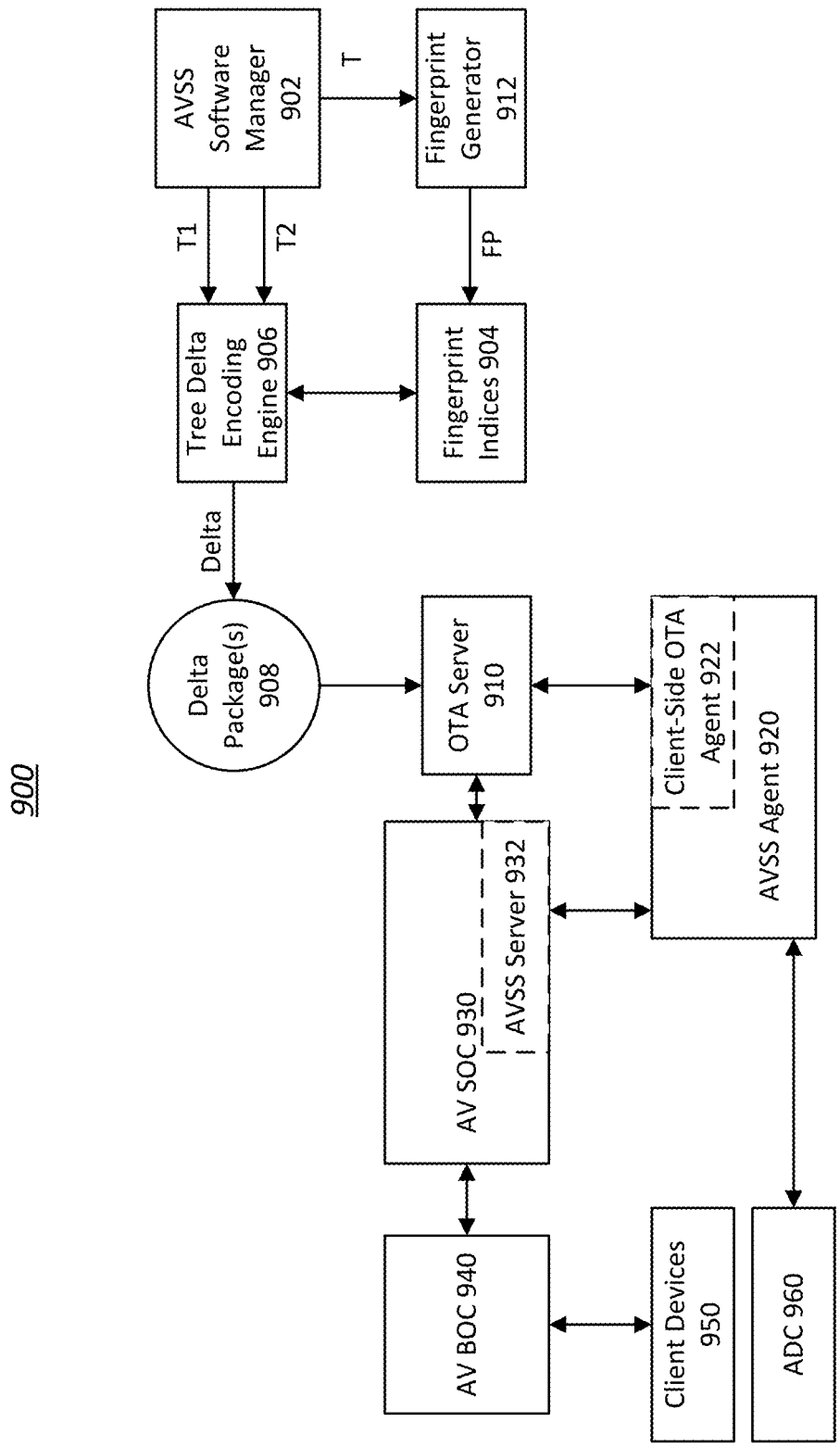
FIG. 9 illustrates an example client-server architecture, in accordance with various embodiments of the disclosure

FIG. 9 illustrates an example client-server architecture 900, in accordance with various embodiments of the disclosure. The client-server architecture 900 may be used to modify or update software, such as an autonomous vehicle safety and security (AVSS) software. Use of the same or similar architecture to modify or update other software are contemplated. The client-server architecture 900 may include an OTA server 910 and an AVSS agent 920. The AVSS agent 920 may include a client-side over-the-air (OTA) agent 922. In some embodiments, the client-side OTA agent 922 may be separate from the AVSS agent 920. The OTA server 910 may include or be coupled (directly or indirectly) to an AVSS software manager 902, a fingerprint generator 912, and a tree delta encoding engine 906.

The AVSS agent 920 may include some or all of the functionalities of the client 820. The client-side OTA agent 922 may include some or all of the functionalities of the client-side agent 822. The OTA server 910 may include some or all of the functionalities of the server 810. The AVSS software manager 902 may include some or all of the functionalities of the software manager 802. The fingerprint generator 912 may include some or all of the functionalities of the fingerprint generator 812. A fingerprint indices 904 may include some or all of the functionalities of the fingerprint indices 804. The tree delta encoding engine 906 may include some or all of the functionalities of the tree delta encoding engine 806. A delta generated by the tree delta encoding engine 906 may be packaged into one or more delta packages 908 for provision by the OTA server 910 to the client-side OTA agent 922.

The AVSS agent 920 may operate on top of an autonomous driving controller (ADC) system for one or more tasks relevant to AVSS. The AVSS agent 920 may communicate with an AVSS server 932. The AVSS server 932 may be located in the cloud of autonomous vehicle security operations center (AV SOC) 930. The AVSS server 932 may perform one or more tasks relevant to AVSS, such as AV safety and security management, remote intervention, safety and security intelligence, safety and security analysis, and forensic analysis. The AV SOC 930 may operate as a security operations center for AV vehicles or fleets. The AV SOC 930 may support one or more safety and security operation functions for AV vehicles or fleets. The AV SOC 930 may communicate with an autonomous vehicle business operations center (AV BOC) 940. The AV BOC 940 may support one or more business operation functions for AV vehicles or fleets. The AV BOC 940 may communicate with one or more client devices 950, such as devices of vehicle drivers or riders.

The AVSS agent 920 may need to be modified or updated when a new AVSS agent software is available. The AVSS agent 920 (or the client-side OTA agent 922) may update software of the AVSS agent 920 using the tree delta encoding described herein. For example, the AVSS agent 920 (or the client-side OTA agent 922) may apply the delta within the delta package(s) 908 to a data tree or a copy of a data tree to construct another data tree (e.g., updated version of the data tree). The AVSS agent 920 (or the client-side OTA agent 922) may perform other tasks, such as downloading the delta package(s) 908 from the OTA server 910, decrypting the delta package(s) 908, verifying the integrity of the delta package(s) 908, and verifying the integrity of the modified/updated data tree before overwriting the original data tree (overwriting the data tree of the AVSS agent 920).

Figure 10A:
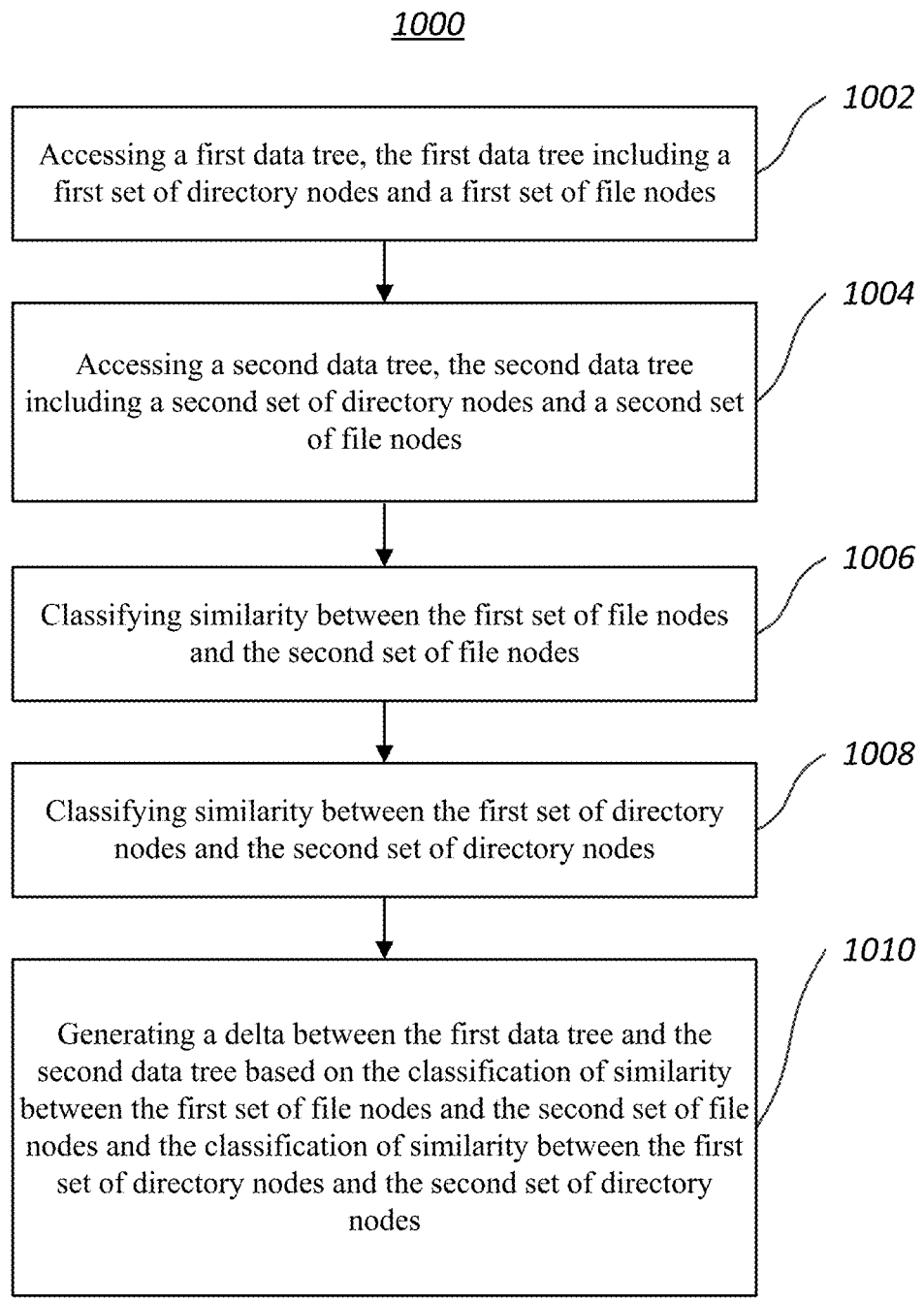
FIG. 10A illustrates a flow chart of an example method, in accordance with various embodiments of the disclosure.

FIG. 10A illustrates a flowchart of an example method 1000, according to various embodiments of the present disclosure. The method 1000 may be implemented in various environments including, for example, the environment 100 of FIG. 1, the architecture 800 of FIG. 8, or the architecture 900 of FIG. 9. The operations of the method 1000 presented below are intended to be illustrative. Depending on the implementation, the method 1000 may include additional, fewer, or alternative steps performed in various orders or in parallel. The method 1000 may be implemented in various computing systems or devices including one or more processors.

With respect to the method 1000, at block 1002, a first data tree may be accessed. The first data tree may include a first set of directory nodes and a first set of file nodes. At block 1004, a second data tree may be accessed. The second data tree may include a second set of directory nodes and a second set of file nodes. At block 1006, similarity between the first set of file nodes and the second set of file nodes may be classified. Similarity between the first set of file nodes and the second set of file nodes may be classified based on file names, file paths, and file values. At block 1008, similarity between the first set of directory nodes and the second set of directory nodes may be classified. Similarity between the first set of directory nodes and the second set of directory nodes may be classified based on directory names, directory paths, nested folders, and included files. At block 1010, a delta between the first data tree and the second data tree may be generated based on the classification of similarity between the first set of file nodes and the second set of file nodes and the classification of similarity between the first set of directory nodes and the second set of directory nodes.

Figure 10B:
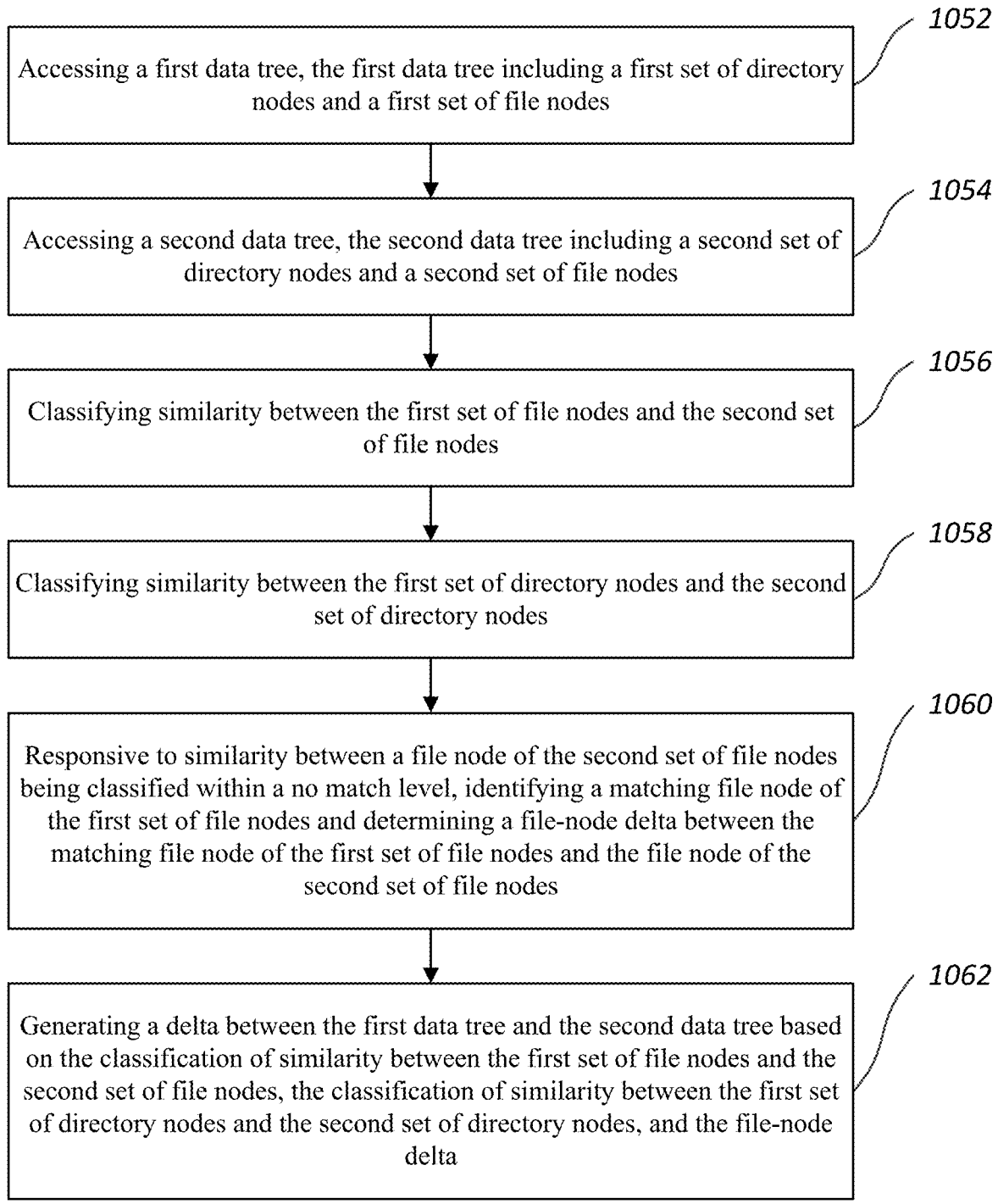
FIG. 10B illustrates a flow chart of an example method, in accordance with various embodiments of the disclosure.

FIG. 10B illustrates a flowchart of an example method 1050, according to various embodiments of the present disclosure. The method 1050 may be implemented in various environments including, for example, the environment 100 of FIG. 1, the architecture 800 of FIG. 8, or the architecture 900 of FIG. 9. The operations of the method 1050 presented below are intended to be illustrative. Depending on the implementation, the method 1050 may include additional, fewer, or alternative steps performed in various orders or in parallel. The method 1050 may be implemented in various computing systems or devices including one or more processors.

With respect to the method 1050, at block 1052, a first data tree may be accessed. The first data tree may include a first set of directory nodes and a first set of file nodes. At block 1054, a second data tree may be accessed. The second data tree may include a second set of directory nodes and a second set of file nodes. At block 1056, similarity between the first set of file nodes and the second set of file nodes may be classified. Similarity between the first set of file nodes and the second set of file nodes may be classified based on file names, file paths, and file values. At block 1058, similarity between the first set of directory nodes and the second set of directory nodes may be classified. Similarity between the first set of directory nodes and the second set of directory nodes may be classified based on directory names, directory paths, nested folders, and included files. At block 1060, responsive to similarity between a file node of the second set of file nodes being classified within a no match level, a matching file node of the first set of file nodes may be identified and a file-node delta between the matching file node of the first set of file nodes and the file node of the second set of file nodes may be determined. The matching file node of the first set of file nodes may be identified based on the fingerprint(s) of the file node of the second set of file nodes. At block 1062, a delta between the first data tree and the second data tree may be generated based on the classification of similarity between the first set of file nodes and the second set of file nodes, the classification of similarity between the first set of directory nodes and the second set of directory nodes, and the file-node delta.

Figure 11:
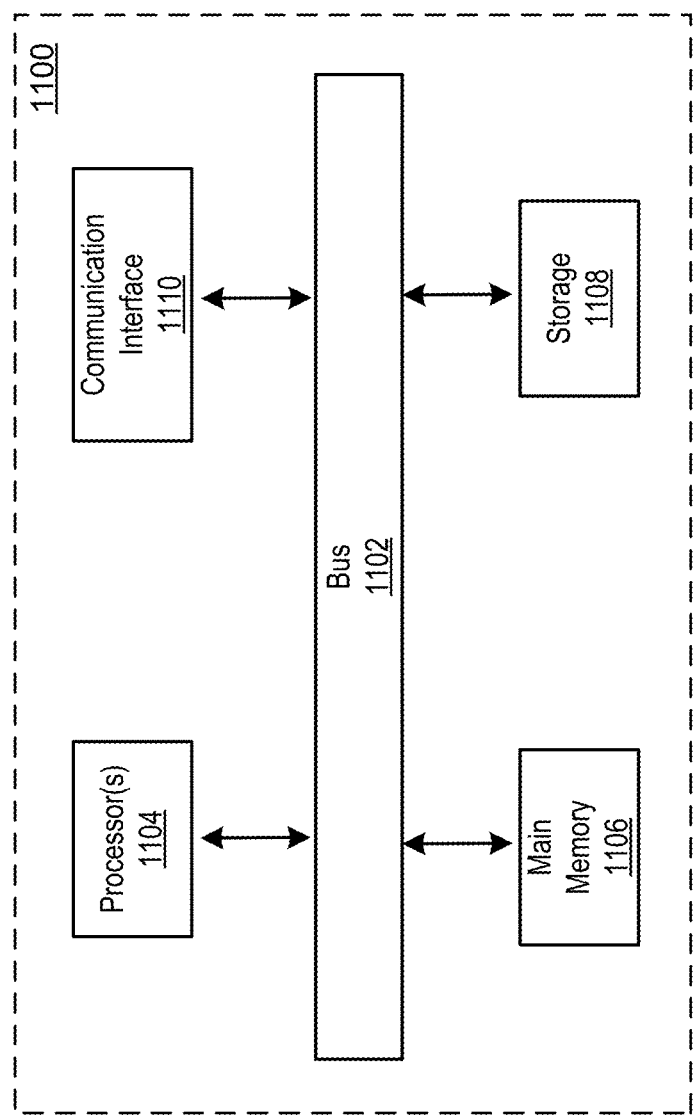
FIG. 11 illustrates a block diagram of an example computer system in which any of the embodiments described herein may be implemented.

FIG. 11 is a block diagram that illustrates a computer system 1100 upon which any of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor(s) 1104. Main memory 1106 also may be used for storing temporary variables or other intermediate information during execution of instructions to be executed by processor(s) 1104. Such instructions, when stored in storage media accessible to processor(s) 1104, render computer system 1100 into a special-purpose machine that is customized to perform the operations specified in the instructions. Main memory 1106 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1108. Execution of the sequences of instructions contained in main memory 1106 causes processor(s) 1104 to perform the process steps described herein. For example, the process/method shown in FIG. 10A and/or FIG. 10B and described in connection with this figure may be implemented by computer program instructions stored in main memory 1106. When these instructions are executed by processor(s) 1104, they may perform the steps as shown in FIG. 10A and/or FIG. 10B and described above. In alternative embodiments, hard-wired circuitry may be used in place of or in combination with software instructions.

The computer system 1100 also includes a communication interface 1110 coupled to bus 1102. Communication interface 1110 provides a two-way data communication coupling to one or more network links that are connected to one or more networks. As another example, communication interface 1110 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for modifying software using a tree-delta encoding, the system comprising:
   a memory; and
   a processor, wherein the memory is coupled to the processor and stores instructions executable by the processor to implement:
   a fingerprint generator configured to generate fingerprints of file nodes within a data tree;
   a software manager configured to provide a first data tree of a first version of the software and a second data tree of a second version of the software to a tree-delta encoding engine, the first data tree including a first set of directory nodes and a first set of file nodes, and the second data tree including a second set of directory nodes and a second set of file nodes; and
   the tree-delta encoding engine configured to generate a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes, the one or more file-node deltas determined based on two or more fingerprints generated by the fingerprint generator;
   wherein:
   similarity between the first set of file nodes and the second set of file nodes and similarity between the first set of directory nodes and the second set of directory nodes are classified within one or more of discrete similarity levels, the discrete similarity levels include two or more of the no match level, a weak match level, a fair match level, and an exact match level; and the delta is packaged for provision to a client-side agent, the client-side agent configured to modify a client-side version of the software based on the delta.

2. The system of claim 1, wherein: the first classification of similarity between the first set of file nodes and the second set of file nodes is performed based on file names, file paths, and file values; and the second classification of similarity between the first set of directory nodes and the second set of directory nodes is performed based on directory names, directory paths, nested folders, and included files.

3. A system for modifying software using a tree-delta encoding, the system comprising:
- a memory; and
- a processor, wherein the memory is coupled to the processor and stores instructions executable by the processor to implement:
- a fingerprint generator configured to generate fingerprints of file nodes within a data tree;
- a software manager configured to provide a first data tree of a first version of the software and a second data tree of a second version of the software to a tree-delta encoding engine, the first data tree including a first set of directory nodes and a first set of file nodes, and the second data tree including a second set of directory nodes and a second set of file nodes; and
- the tree-delta encoding engine configured to generate a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes, the one or more file-node deltas determined based on two or more fingerprints generated by the fingerprint generator;
- wherein the delta is packaged for provision to a client-side agent, the client-side agent configured to modify a client-side version of the software based on the delta.

4. The system of claim 3, wherein the first classification of similarity between the first set of file nodes and the second set of file nodes is performed based on file names, file paths, and file values.

5. The system of claim 4, wherein the second classification of similarity between the first set of directory nodes and the second set of directory nodes is performed based on directory names, directory paths, nested folders, and included files.

6. The system of claim 5, wherein similarity between the first set of file nodes and the second set of file nodes and similarity between the first set of directory nodes and the second set of directory nodes are classified within one or more of discrete similarity levels.

7. The system of claim 6, wherein the discrete similarity levels include two or more of the no match level, a weak match level, a fair match level, and an exact match level.

8. The system of claim 3, wherein the client-side agent further performs one or more of downloading a delta package, decrypting the delta package, and/or verifying integrity of the delta package.

9. The system of claim 3, wherein the software includes an autonomous vehicle safety and security agent software.

10. The system of claim 3, wherein the delta between the first data tree and the second data tree is generated as a sequence of edit operations to be applied to a copy of the first data tree to construct a copy of the second data tree.

11. The system of claim 3, wherein the delta between the first data tree and the second data tree is generated as a sequence of edit operations to be applied to an empty tree to construct a copy of the second data tree.

12. A method for modifying software using a tree-delta encoding, the method comprising:
- generating fingerprints of one or more file nodes within a first data tree and one or more file nodes within a second data tree; providing the first data tree of a first version of the software and the second data tree of a second version of the software, the first data tree including a first set of directory nodes and a first set of file nodes, and the second data tree including a second set of directory nodes and a second set of file nodes; and
- generating a delta between the first data tree and the second data tree based on a first classification of similarity between the first set of file nodes and the second set of file nodes, a second classification of similarity between the first set of directory nodes and the second set of directory nodes, and one or more file-node deltas between one or more file nodes of the first set of file nodes and one or more file nodes of the second set of file nodes, the one or more file-node deltas determined based on two or more of the fingerprints;
- wherein the delta is packaged for provision to a client-side agent, the client-side agent configured to modify a client-side version of the software based on the delta.

13. The method of claim 12, wherein the first classification of similarity between the first set of file nodes and the second set of file nodes is performed based on file names, file paths, and file values.

14. The method of claim 13, wherein the second classification of similarity between the first set of directory nodes and the second set of directory nodes is performed based on directory names, directory paths, nested folders, and included files.

15. The method of claim 14, wherein similarity between the first set of file nodes and the second set of file nodes and similarity between the first set of directory nodes and the second set of directory nodes are classified within one or more of discrete similarity levels.

16. The method of claim 15, wherein the discrete similarity levels include two or more of the no match level, a weak match level, a fair match level, and an exact match level.

17. The method of claim 12, wherein the client-side agent further performs one or more of downloading a delta package, decrypting the delta package, and/or verifying integrity of the delta package.

18. The method of claim 12, wherein the software includes an autonomous vehicle safety and security agent software.

19. The method of claim 12, wherein the delta between the first data tree and the second data tree is generated as a sequence of edit operations to be applied to the a copy of the first data tree to construct a copy of the second data tree.

20. The method of claim 12, wherein the delta between the first data tree and the second data tree is generated as a sequence of edit operations to be applied to an empty tree to construct a copy of the second data tree.

* * * * *